(12) United States Patent
Gracia Berna et al.

(10) Patent No.: US 12,136,348 B2
(45) Date of Patent: Nov. 5, 2024

(54) SYSTEMS AND METHODS FOR FLIGHT PERFORMANCE PARAMETER COMPUTATION

(71) Applicant: THE BOEING COMPANY, Chicago, IL (US)

(72) Inventors: Antonio Gracia Berna, Madrid (ES); Javier Lopez Leones, Madrid (ES); Ruben Vega Astorga, Madrid (ES); Maria del Pozo Dominguez, Madrid (ES); Manuel Polaina Morales, Munich (DE)

(73) Assignee: THE BOEING COMPANY, Arlington, VA (US)

( * ) Notice: Subject to any disclaimer, the term of this patent is extended or adjusted under 35 U.S.C. 154(b) by 328 days.

(21) Appl. No.: 17/175,255

(22) Filed: Feb. 12, 2021

(65) Prior Publication Data

US 2021/0375141 A1    Dec. 2, 2021

(30) Foreign Application Priority Data

Jun. 2, 2020  (EP) .................................... 20382469

(51) Int. Cl.
*G08G 5/00* (2006.01)
*G05D 1/00* (2024.01)
*G06N 3/044* (2023.01)

(52) U.S. Cl.
CPC ............. *G08G 5/003* (2013.01); *G05D 1/101* (2013.01); *G08G 5/0017* (2013.01); *G08G 5/0052* (2013.01)

(58) Field of Classification Search
CPC ...... G05D 1/101; G05D 1/0202; G05D 1/042; G05D 1/0607; G05D 1/0808;
(Continued)

(56) References Cited

U.S. PATENT DOCUMENTS 10,071,818 B2  9/2018  Kim et al.
10,121,384 B2  11/2018  Hale et al.
(Continued)

FOREIGN PATENT DOCUMENTS

EP  2796956 A3   3/2015
EP  3378784 A1   9/2018
EP  3572332 B1   10/2020

OTHER PUBLICATIONS

Alligier, Richard, et al. "Machine Learning Applied to Airspeed Prediction During Climb," ATM Seminar 2015, 11th USA/Europe Air Traffic Management R&D Seminar, FFA & Eurocontrol, Jun. 2015, pp. 1-10.

(Continued)

*Primary Examiner* — Dale Moyer
*Assistant Examiner* — Tanner L Cullen
(74) *Attorney, Agent, or Firm* — Moore IP Law (57) ABSTRACT

A device includes a memory, a network interface, and a processor. The memory is configured to store an aircraft performance model. The aircraft performance model is based on historical flight data of one or more aircraft. The aircraft performance model includes a recurrent neural network layer. The network interface is configured to receive real-time time-series flight data from a data bus of a first aircraft. The processor is configured to receive, via the network interface, the real-time time-series flight data. The processor is also configured to generate, based on the real-time time-series flight data and the aircraft performance model, one or more aircraft performance parameters. The processor is further configured to provide the aircraft performance parameters to a display device.

20 Claims, 7 Drawing Sheets

(58) Field of Classification Search
CPC .. G08G 5/0091; G08G 5/0021; G08G 5/0017; G08G 5/003; G08G 5/0052; G08G 5/0039; G06N 3/044; G06N 3/08; G06N 3/02; G07C 5/0841; G07C 5/0816; G07C 5/0808; G07C 5/08; B64C 19/00; B64D 45/00; B64D 43/00; B64D 43/02
See application file for complete search history.

(56) References Cited

U.S. PATENT DOCUMENTS

| | | | |
|---|---|---|---|
| 10,140,873 B2 | 11/2018 | Adler et al. | |
| 10,565,885 B2 | 2/2020 | Adler et al. | |
| 10,752,339 B2 | 8/2020 | Hreha et al. | |
| 11,410,111 B1* | 8/2022 | Washam | G06N 20/00 |
| 11,734,614 B1* | 8/2023 | Wang | G06N 3/044 |
| | | | 706/12 |
| 2009/0187292 A1* | 7/2009 | Hreha | B64C 13/0421 |
| | | | 701/4 |
| 2014/0316613 A1* | 10/2014 | Jang | G05B 23/0286 |
| | | | 701/3 |
| 2017/0132938 A1* | 5/2017 | Lax | G08G 5/0095 |
| 2018/0268722 A1* | 9/2018 | Meier | G01C 21/005 |
| 2019/0107846 A1* | 4/2019 | Roy | G08G 5/0043 |
| 2019/0130769 A1* | 5/2019 | Rodriguez Bravo | G07C 5/08 |
| 2019/0354644 A1* | 11/2019 | Orhan | B64D 45/00 |
| 2019/0392309 A1* | 12/2019 | Bhatnagar | G06N 20/20 |
| 2020/0168108 A1* | 5/2020 | Letsu-Dake | G08G 5/0013 |
| 2020/0273348 A1 | 8/2020 | Root et al. | |

OTHER PUBLICATIONS

Alligier, Richard, et al., Machine Learning and Mass Estimation Methods for Ground-Based Aircraft Climb Predition, IEEE Transactions on Intelligent Transportation Systems, IEEE, 2015, pp. 1-12.

Chati, Yashovardham et al., "A Gaussian Process Regression Approach to Model Aircraft Engine Fuel Flow Rate," Proceedings of the 8th ACM/IEEE International Conference on Cyber-Physical Systems, Pittsburgh, PA, Apr. 2017, pp. 131-140.

Chati, Yashovardham et al., "Statistical Modeling of Aircraft Engine Fuel Flow Rate," 30th Congress of International Council of the Aeronautical Sciences, Sep. 2016, pp. 1-10.

Hochreiter, Sepp, et al. "Long Short-Term Memory," Neural Computation 9, 1997, pp. 1-32.

Hrastovec, Marko, et al., "Machine Learning Model for Aircraft Performances," 33rd Digital Avionics Systems Conference, Oct. 2014, IEEE, pp. 8C4-1 to 8C4-10.

Hrastovec, Marko, et al., "Prediction of aircraft performances based on data collected by air traffic control centers," Transportation Research Part C, vol. 73, 2016, pp. 167-182.

Uzun, Mevlut et al., "Design of a Hybrid Digital-twin Flight Performance Model through Machine Learning," 2019, IEEE, pp. 1-14.

Yanto, Jefry, et al. "Aircraft fuel burn performance study: A data-enhanced modeling approach," Transportation Research Part D, vol. 65, 2018, pp. 574-595.

* cited by examiner

SYSTEMS AND METHODS FOR FLIGHT PERFORMANCE PARAMETER COMPUTATION

FIELD OF THE DISCLOSURE

The present disclosure is generally related to systems and methods for determining flight performance parameters.

BACKGROUND

Aircraft typically include various sensors that generate flight data that can be used to determine aircraft performance parameters. Calculation of particular types of aircraft performance parameters is time intensive, depends on data that cannot be determined during flight, or both. Such aircraft performance parameters are not available in real-time during a flight to inform pilot flight decisions.

SUMMARY

In a particular implementation, a device for flight performance parameter computation includes a memory, a network interface, and a processor. The memory is configured to store an aircraft performance model. The aircraft performance model is based on historical flight data of one or more aircraft. The aircraft performance model includes a recurrent neural network layer. The network interface is configured to receive real-time time-series flight data from a data bus of a first aircraft. The processor is configured to receive, via the network interface, the real-time time-series flight data. The processor is also configured to generate, based on the real-time time-series flight data and the aircraft performance model, one or more aircraft performance parameters. The processor is further configured to provide the aircraft performance parameters to a display device.

In another particular implementation, a method of flight performance parameter computation. The method includes receiving, at a device, real-time time-series flight data of a first aircraft. The method also includes generating one or more aircraft performance parameters based on the real-time time-series flight data and an aircraft performance model. The aircraft performance model is based on historical flight data of one or more aircraft. The aircraft performance model includes a recurrent neural network layer. The method further includes providing the aircraft performance parameters to a display device.

In another particular implementation, a computer-readable storage device stores instructions that, when executed by one or more processors, cause the one or more processors to receive real-time time-series flight data of a first aircraft. The instructions, when executed by the one or more processors, also cause the one or more processors to generate one or more aircraft performance parameters based on the real-time time-series flight data and an aircraft performance model. The aircraft performance model is based on historical flight data of one or more aircraft. The aircraft performance model includes a recurrent neural network layer. The instructions, when executed by the one or more processors, also cause the one or more processors to provide the aircraft performance parameters to a display device.

The features, functions, and advantages described herein can be achieved independently in various implementations or may be combined in yet other implementations, further details of which can be found with reference to the following description and drawings.

DETAILED DESCRIPTION

Implementations described herein are directed to systems and methods for flight performance parameter computation. A particular aircraft includes an on-board computing device that has access to an aircraft performance model. In a particular example, the aircraft performance model is associated with historical flight data of the particular aircraft, other aircraft of a same aircraft type as the particular aircraft, other aircraft of another aircraft type, or a combination thereof.

A parameter generator generates flight performance parameters based on real-time time-series flight data of the particular aircraft. The flight performance parameters represent real-time aircraft performance specific to the particular aircraft. In some examples, the parameter generator is integrated into an on-board computing device of the particular aircraft. In alternative examples, an off-board device (e.g., a ground-based device) includes the parameter generator. The on-board computing device includes a graphical user interface (GUI) generator. The GUI generator receives the flight performance parameters from the parameter generator and generates a GUI indicating one or more of the flight performance parameters. The GUI generator provides the GUI to a display device of the particular aircraft.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Figure 1:
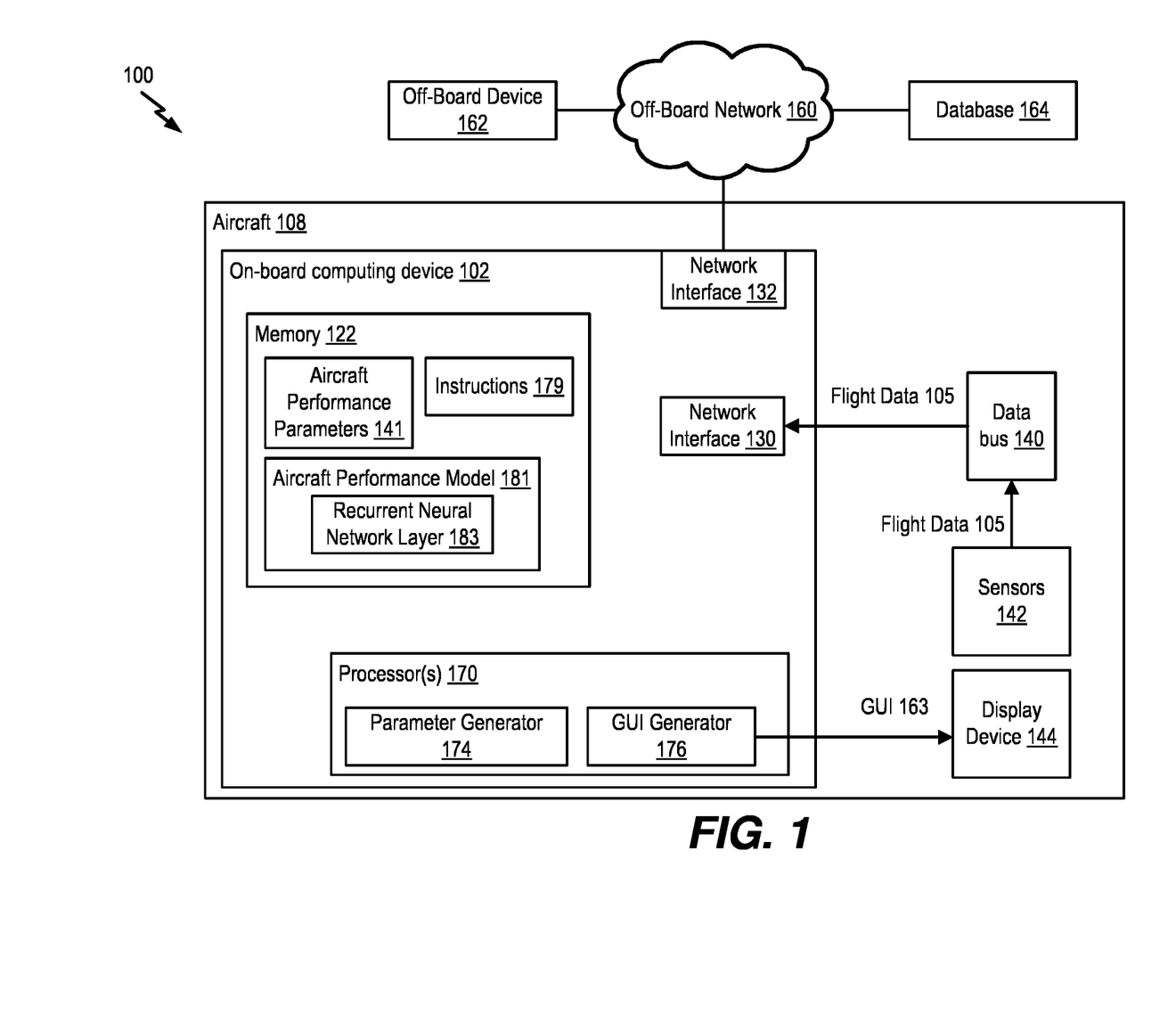
FIG. 1 is a block diagram that illustrates a system for flight performance parameter computation.

Referring to FIG. 1, a system 100 for flight performance parameter computation is shown. The system 100 includes an aircraft 108. The aircraft 108 includes an on-board computing device 102, a data bus 140, one or more sensors 142, a display device 144, or a combination thereof. The on-board computing device 102 includes one or more processors 170, a memory 122, a network interface 130 (e.g., a first network interface), a network interface 132 (e.g., a second network interface), or a combination thereof. In a particular aspect, the on-board computing device 102 includes or corresponds to an aircraft integration device (AID), a flight management system, or both. It should be understood that the on-board computing device 102 is provided as an illustrative example. In some examples, the on-board computing device 102 corresponds to a mobile device (e.g., a tablet, a communication device, a computing device, or a combination thereof) that can be on-board the aircraft 108 at various times and off-board the aircraft 108 at other times. In a particular aspect, the memory 122, the network interface 130, the processor 170, a parameter generator 174, a GUI generator 176, the on-board computing device 102, or a combination thereof, are integrated into a portable Electronic Flight Bag (EFB) computer. In a particular aspect an EFB computer includes a tablet, a mobile device, a communication device, a computing device, or a combination thereof.

It should be noted that in the following description, various functions performed by the system 100 of FIG. 1 are described as being performed by certain components or modules. However, this division of components and modules is for illustration only. In an alternate aspect, a function described herein as performed by a particular component or module is divided amongst multiple components or modules. Moreover, in an alternate aspect, two or more components or modules of FIG. 1 are integrated into a single component or module. In a particular aspect, one or more functions described herein as performed by the on-board computing device 102 are divided amongst multiple devices (e.g., the on-board computing device 102, an AID, a flight management system, a central server, a distributed system, or any combination thereof). Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The memory 122 includes volatile memory devices (e.g., random access memory (RAM) devices), nonvolatile memory devices (e.g., read-only memory (ROM) devices, programmable read-only memory, and flash memory), or both. In a particular aspect, the memory 122 includes one or more applications (e.g., instructions) executable by the processor 170 to initiate, control, or perform one or more operations described herein. In an illustrative example, a computer-readable storage device (e.g., the memory 122) includes instructions that, when executed by the processor 170, cause the processor 170 to initiate, perform, or control operations described herein. In a particular aspect, the memory 122 is configured to store instructions 179 that are executable by the processor 170 to perform one or more operations described herein.

The memory 122 is configured to store an aircraft performance model 181. In a particular aspect, the aircraft performance model 181 is associated with the aircraft 108, an aircraft type 187 of the aircraft 108, one or more other aircraft, or a combination thereof. For example, an off-board device 162 (or another device) generates the aircraft performance model 181 based on aircraft performance of the aircraft 108, a representative aircraft (e.g., a newly manufactured aircraft) of the same aircraft type as the aircraft 108, one or more other aircraft, or a combination thereof, as further described with reference to FIGS. 2-4. In a particular aspect, the aircraft performance model 181 includes at least a recurrent neural network layer 183 (e.g., a long short-term memory (LSTM) network layer), as further described with reference to FIG. 4. The recurrent neural network layer 183 enables the aircraft performance model 181 to exhibit temporal dynamic behavior. For example, the recurrent neural network layer 183 enables the aircraft performance model 181 to process real-time time-series data (e.g., the flight data 105) and detect temporal trends. The aircraft performance model 181 can include one or more additional network layers (e.g., a convolutional neural network (CNN) layer) that incorporate time delays, data compression, feedback loops, etc.

The sensors 142 are configured to provide flight data 105 (e.g., real-time time-series flight data) to the data bus 140. The flight data 105 indicate measurements performed by the sensors 142, as further described with reference to FIG. 5. The on-board computing device 102 is configured to receive the flight data 105 via the network interface 130 from the data bus 140. In a particular aspect, the on-board computing device 102 (e.g., an aircraft integration device) obtains the flight data 105 as one or more of the sensors 142 provide the flight data 105 via the data bus 140 to a digital flight data recorder. In a particular example, the on-board computing device 102 obtains, at a first time, a first portion of the flight data 105 from a first sensor of the sensors 142. The on-board computing device 102 obtains, at a second time, a second portion of the flight data 105 from a second sensor of the sensors 142. To illustrate, the first sensor provides the first portion of the flight data 105 at first time intervals, in response to detecting a first event, or both. The second sensor provides the second portion of the flight data 105 at second time intervals, in response to detecting a second event, or both. In a particular aspect, one or more of the sensors 142 continuously provide portions of the flight data 105 during operation of the aircraft 108, e.g., during flight or ground maneuvers.

In a particular aspect, the network interface 132 is configured to communicate, via an off-board network 160, with an off-board device 162 (e.g., a ground-based device), a database 164, or both. The off-board network 160 includes a wired network, a wireless network, or both. The off-board network 160 includes one or more of a local area network (LAN), a wide area network (WAN), a cellular network, and a satellite network.

The processor 170 includes the parameter generator 174, the GUI generator 176, or both. The parameter generator 174 is configured to generate aircraft performance parameters 141 based on the flight data 105, as further described with reference to FIG. 5. For example, the aircraft performance parameters 141 represent real-time aircraft performance of the aircraft 108. "Aircraft performance parameters" as used herein refers to values derived from flight sensor data. The parameter generator 174 stores the flight data 105, the aircraft performance parameters 141, or a combination thereof, in the memory 122. In a particular aspect, the parameter generator 174 provides the flight data 105, the aircraft performance parameters 141, or a combination thereof, to the off-board device 162, the database 164, or both.

In a particular aspect, the parameter generator 174 is integrated into the off-board device 162. In this aspect, the off-board device 162 includes a memory configured to store data used (or generated) by the parameter generator 174. The on-board computing device 102 receives the aircraft performance parameters 141, via the off-board network 160, from the off-board device 162. The on-board computing device 102 stores the aircraft performance parameters 141 in the memory 122. The GUI generator 176 is configured to generate a GUI 163 indicating one or more of the aircraft performance parameters 141.

During operation, the sensors 142 provide the flight data 105 to the data bus 140 during operation (e.g., a flight) of the aircraft 108. The sensors 142 provide the flight data 105 (e.g., real-time time-series flight data) to the data bus 140 at a particular time interval, in response to detecting an event, in response to receiving a request from a component of the aircraft 108, continuously, or a combination thereof. In a particular aspect, the flight data 105 indicates measurements performed by the sensors 142 during the flight. For example, the flight data 105 indicates a detected Mach number, a detected total air temperature, a detected wind speed, a detected wind direction, a detected ground speed, a detected altitude, a detected heading, another detected condition, or a combination thereof, of the aircraft 108. The parameter generator 174 determines the aircraft performance parameters 141 based on the flight data 105, as further described with reference to FIG. 5. For example, the parameter generator 174 generates the aircraft performance parameters 141 based on the flight data 105 and the aircraft performance model 181. To illustrate, the aircraft performance parameters 141 include a drag, a lift, a mass, a fuel consumption, another aircraft performance parameter, or a combination thereof, of the aircraft 108 predicted by the aircraft performance model 181 as corresponding to the flight data 105, as further described with reference to FIG. 5. The aircraft performance model 181 can predict the aircraft performance parameters 141 in real-time (e.g., within 2 minutes of generation or receipt of the flight data 105) improving a pilot's situational awareness and enabling the pilot of the aircraft 108 to make informed flight decisions based on real-time data.

In a particular aspect, the parameter generator 174 provides particular data (e.g., the flight data 105, the aircraft performance parameters 141, or a combination thereof) to the database 164 in response to determining that the on-board computing device 102 is within a communication range of the database 164, determining that the aircraft 108 has a particular status (e.g., landed), receiving a user input indicating that the particular data is to be provided to the database 164, receiving a request from the off-board device 162, or a combination thereof. In this aspect, the particular data (e.g., the flight data 105, the aircraft performance parameters 141, or a combination thereof) can be used to further train the aircraft performance model 181, another aircraft performance model, or both, as further described with reference to FIGS. 2-3. The GUI generator 176 generates the GUI 163 indicating the flight data 105, the aircraft performance parameters 141, or a combination thereof. In a particular aspect, the GUI generator 176 generates one or more recommended settings (e.g., a recommended trim setting) based on the aircraft performance parameters 141. In this aspect, the GUI 163 indicates the recommended settings. The GUI generator 176 provides the GUI 163 to the display device 144. In a particular aspect, a flight control system (e.g., an auto-pilot system) of the aircraft 108 automatically updates a setting (e.g., a trim setting) based on one or more of the aircraft performance parameters 141. The system 100 thus enables computation of the aircraft performance parameters 141 that are based on real-time time-series flight data (e.g., the flight data 105). Using the aircraft performance model 181 (e.g., a machine-learning model) improves the on-board computing device 102 and the aircraft 108 by enabling the aircraft performance parameters 141 to be estimated in real-time rather than using more time-intensive calculations after landing. One or more of the aircraft performance parameters 141, the recommended settings, or a combination thereof, can be displayed to improve pilot situational awareness and to enable the pilot to make informed flight decisions based on real-time data. For example, the pilot can update a flight setting, such as accept or edit a recommended setting, based on the displayed information. In some examples, flight control settings of the aircraft 108 can be automatically adjusted based on the aircraft performance parameters 141.

Figure 2:
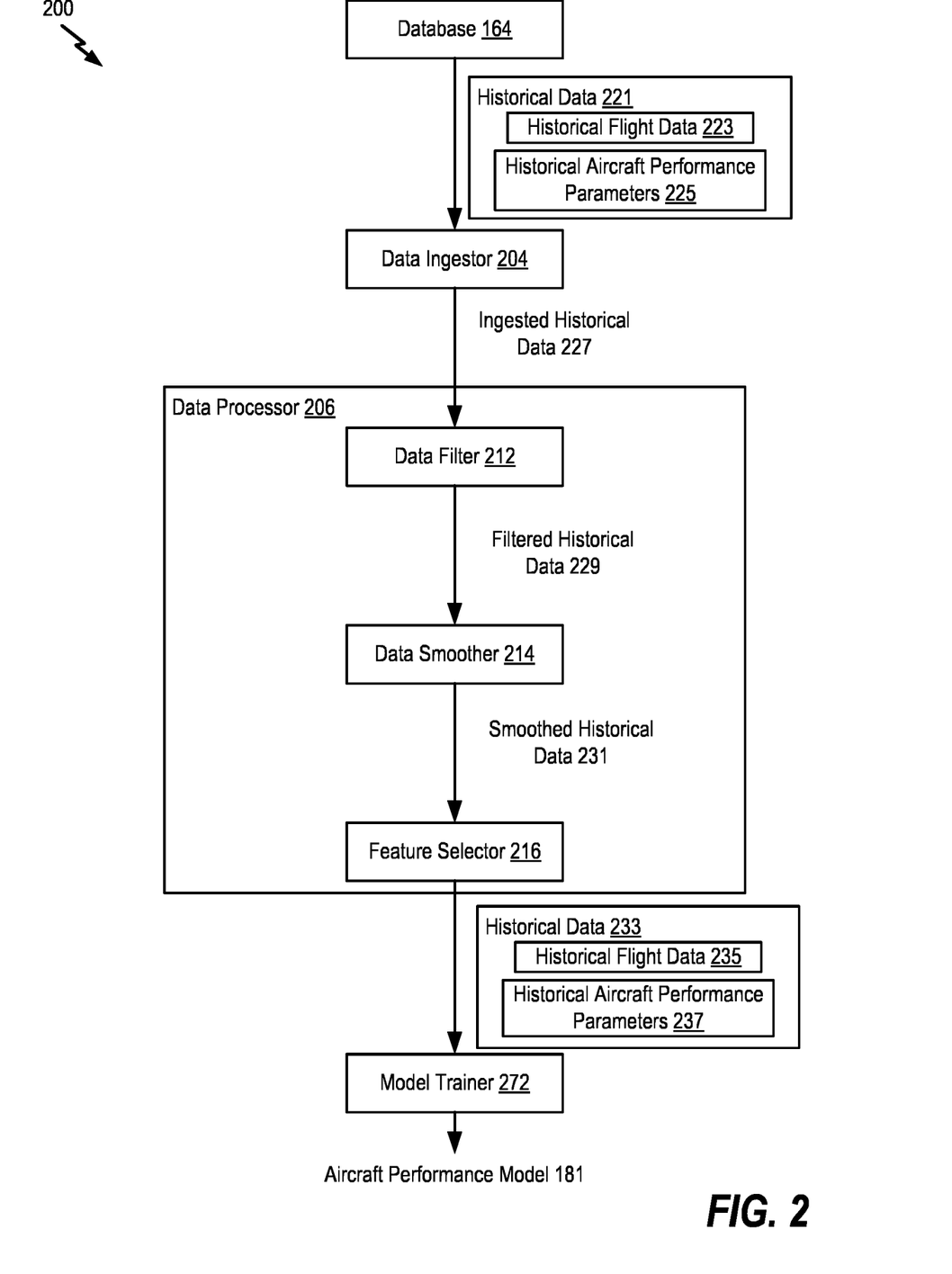
FIG. 2 is a diagram that illustrates an example of a system for training an aircraft performance model of FIG. 1.
Figure 3:
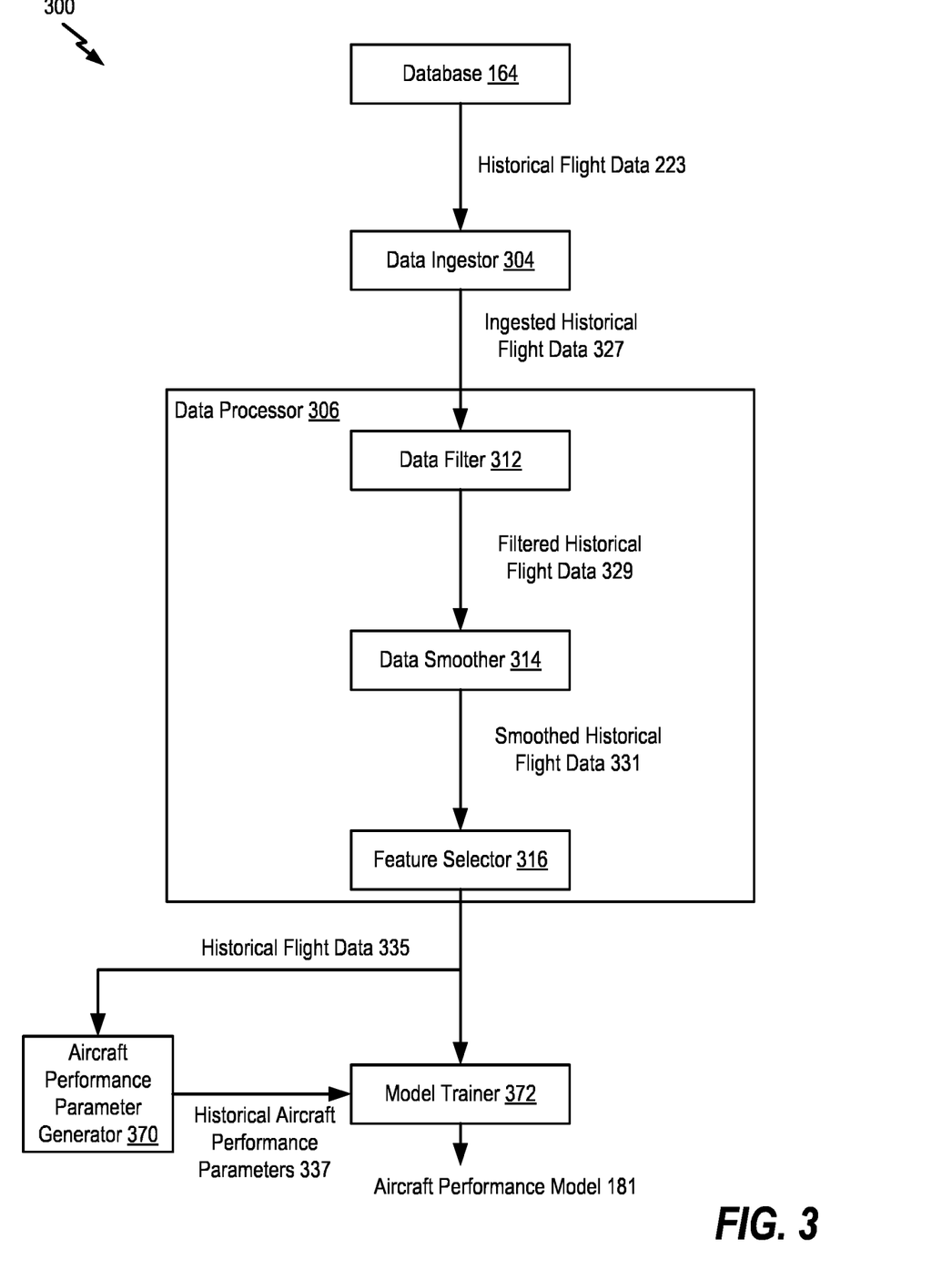
FIG. 3 is a diagram that illustrates another example of a system for training an aircraft performance model of FIG. 1.
Figure 4:
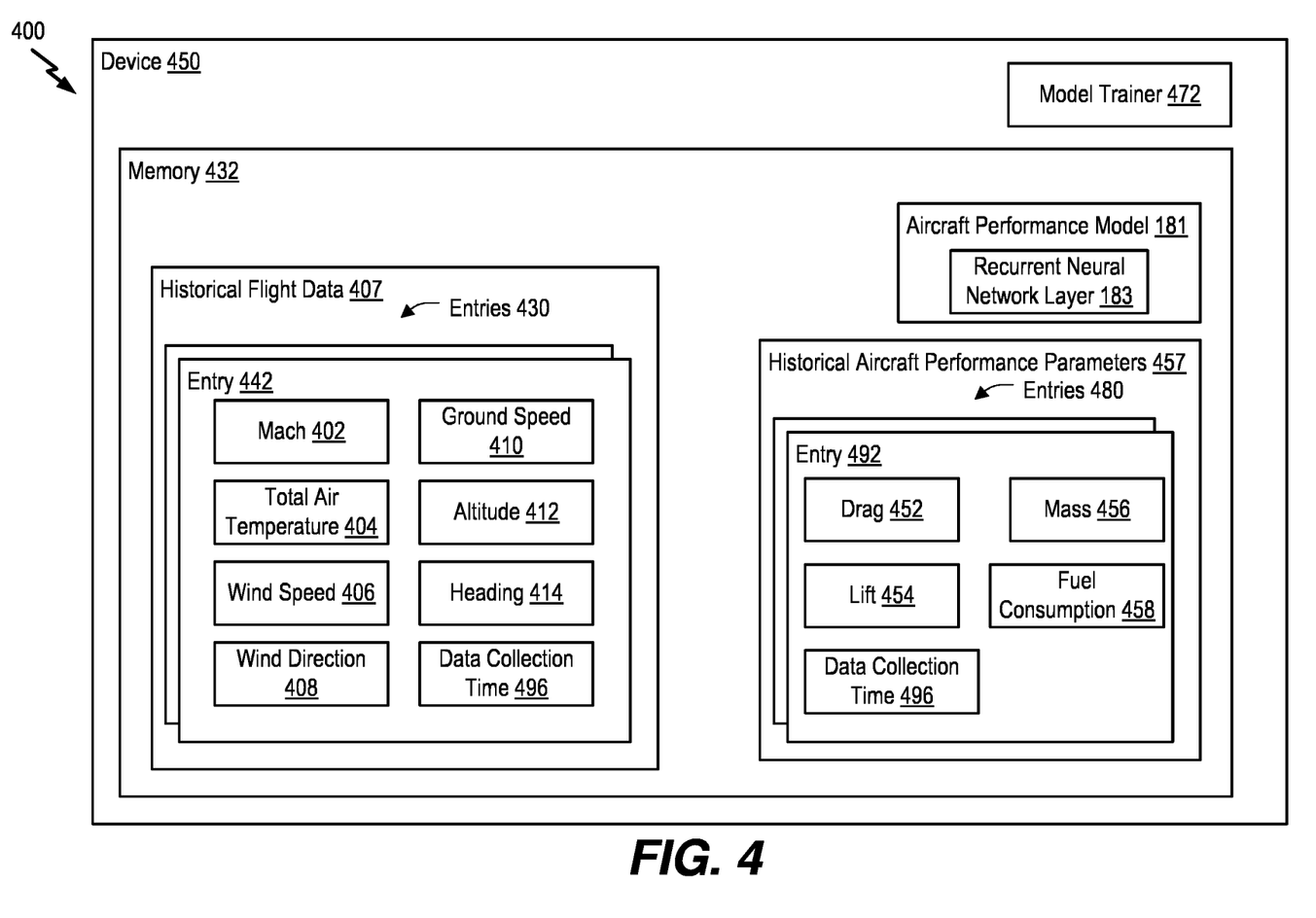
FIG. 4 is a diagram that illustrates aspects of another example of a system for training an aircraft performance model of FIG. 1.

FIGS. 2-4 illustrate examples of systems for training the aircraft performance model 181. FIG. 2 illustrates that historical flight data and corresponding historical aircraft performance parameters are retrieved from a database for training the aircraft performance model 181. FIG. 3 illustrates that historical flight data is retrieved from a database and corresponding historical aircraft performance parameters are calculated for training the aircraft performance model 181. FIG. 4 illustrates training of the aircraft performance model 181 based on the historical flight data and the corresponding historical aircraft performance parameters.

Referring to FIG. 2, a system 200 includes the database 164, a data ingestor 204, a data processor 206, a model trainer 272, or a combination thereof. The data processor 206 includes a data filter 212, a data smoother 214, a feature selector 216, or a combination thereof. The database 164 is configured to store historical data 221 that includes historical flight data 223 and corresponding historical aircraft performance parameters 225.

In a particular example, the historical flight data 223 includes first flight data of a first aircraft that is distinct from the aircraft 108. The historical flight data 223 also includes first aircraft performance parameters corresponding to the first flight data. In a particular aspect, a first aircraft performance model of the first aircraft is used to generate the first aircraft performance parameters by processing the first flight data in real-time, as described with reference to FIG. 1. In an alternative aspect, time-intensive calculations are performed, as further described with reference to FIG. 3, to generate the first aircraft performance parameters by processing the first flight data. The model trainer 272 is configured to generate the aircraft performance model 181 based on the first flight data and the corresponding first aircraft performance parameters.

In a particular example, the historical flight data 223 includes the flight data 105 of the aircraft 108, second flight data of a second aircraft that is distinct from the aircraft 108, or a combination thereof. The model trainer 272 is configured to update the aircraft performance model 181 based on the flight data 105 and the aircraft performance parameters 141, the second flight data and corresponding second aircraft performance parameters, or a combination thereof. The second aircraft performance parameters can be generated using a second aircraft performance model or time-intensive calculations. In a particular aspect, an aircraft type of the aircraft 108 is the same as a first aircraft type of the first aircraft, a second aircraft type of the second aircraft, or both. In a particular aspect, the aircraft type of the aircraft 108 is distinct from the first aircraft type of the first aircraft, the second aircraft type of the second aircraft, or both.

During operation, the data ingestor 204 receives the historical data 221 from the database 164. For example, the data ingestor 204 retrieves the historical data 221 in response to detecting an event. In a particular aspect, detecting the event includes receiving a user input initiating training of the aircraft performance model 181, detecting that a timer has expired, detecting that the historical data 221 has been added to the database 164, or a combination thereof. The data ingestor 204 converts the historical data 221 from a first format (e.g., a binary format) to ingested historical data 227 having a second format (e.g., a comma separated value (CSV) format). The data ingestor 204 provides the ingested historical data 227 to the data processor 206.

The data filter 212 generates filtered historical data 229 by cleaning and filtering the ingested historical data 227. For example, the ingested historical data 227 can include incorrect values due to conversion errors from the first format to the second format. The data filter 212 cleans the ingested historical data 227 by removing the incorrect values. For example, the data filter 212 removes values that are outside a data validity range from the ingested historical data 227 to generate cleaned data. In a particular example, the ingested historical data 227 may include outliers or noise in the sensor measurements. The data filter 212 uses various filtering techniques (e.g., Savitzky-Golay filtering) to remove the outliers from the cleaned data to generate the filtered historical data 229. The data smoother 214 generates smoothed historical data 231 by using various smoothing techniques to process (e.g., remove noise from) the filtered historical data 229. The feature selector 216 uses machine learning feature selection techniques to select features from the smoothed historical data 231. For example, the smoothed historical data 231 includes smoothed historical flight data. The feature selector 216 selects one or more features and corresponding feature values of the smoothed historical flight data as historical flight data 235. The feature selector 216 provides the historical flight data 235 and corresponding historical aircraft performance parameters 237 as historical data 233 to the model trainer 272. The model trainer 272 generates (or updates) the aircraft performance model 181 based on the historical data 233, as further described with reference to FIG. 4.

In a particular implementation, one or more of the data ingestor 204, the data filter 212, the data smoother 214, or the feature selector 216 are optional. For example, the historical data 221 could be stored in the database 164 in a format that does not have to be converted into another format by the data ingestor 204 prior to processing by subsequent components of the system 200. In another example, the historical data 221 (or data derived from the historical data 221) could be processed by subsequent components of the system 200 without filtering by the data filter 212, smoothing by the data smoother 214, or both. In a particular example, feature values of all features of the historical flight data 223 (or flight data derived from the historical flight data 223) can be provided to the model trainer 272 without performing feature selection by the feature selector 216.

Referring to FIG. 3, a system 300 includes the database 164, a data ingestor 304, a data processor 306, an aircraft performance parameter generator 370, a model trainer 372, or a combination thereof. The data processor 306 includes a data filter 312, a data smoother 314, a feature selector 316, or a combination thereof. The database 164 is configured to store the historical flight data 223.

The data ingestor 304, the data filter 312, the data smoother 314, and the feature selector 316 perform similar functions as the data ingestor 204, the data filter 212, the data smoother 214, and the feature selector 216 of FIG. 2 on versions of the historical flight data 223 (and not historical aircraft performance parameters). For example, the data ingestor 304 converts the historical flight data 223 from a first format (e.g., a binary format) to ingested historical flight data 327 having a second format (e.g., a comma separated value (CSV) format). The data filter 312 generates filtered historical flight data 329 by cleaning and filtering the ingested historical flight data 327. The data smoother 314 generates smoothed historical flight data 331 by using various smoothing techniques to process (e.g., remove noise from) the filtered historical flight data 329. The feature selector 316 uses machine learning feature selection techniques to select features from the smoothed historical flight data 331. The feature selector 316 selects one or more features and corresponding feature values of the smoothed historical flight data 331 as historical flight data 335. The feature selector 316 provides the historical flight data 335 to the aircraft performance parameter generator 370 and to the model trainer 372.

The aircraft performance parameter generator 370 generates historical aircraft performance parameters 337 based on the historical flight data 335. For example, the aircraft performance parameter generator 370 determines drag, lift, mass, fuel consumption, or a combination thereof, using time-intensive calculations (e.g., independently of a neural network) to process the historical flight data 335. The model trainer 372 generates (or updates) the aircraft performance model 181 based on the historical flight data 335 and the corresponding historical aircraft performance parameters 337, as further described with reference to FIG. 4.

Referring to FIG. 4, a system for training the aircraft performance model 181 is shown and generally designated 400. The system 400 includes a device 450 that includes a model trainer 472 and a memory 432. In a particular aspect, the model trainer 472 corresponds to the model trainer 272 of FIG. 2, the model trainer 372 of FIG. 3, or both. In a particular aspect, the device 450 corresponds to the on-board computing device 102 or the off-board device 162 of FIG. 1.

The model trainer 472 trains (e.g., generates or updates) the aircraft performance model 181 based on historical flight data 407 and corresponding historical aircraft performance parameters 457. In a particular aspect, the historical flight data 407 and the historical aircraft performance parameters 457 correspond to the historical flight data 235 and the historical aircraft performance parameters 237 of FIG. 2. In an alternative aspect, the historical flight data 407 and the historical aircraft performance parameters 457 correspond to the historical flight data 335 and the historical aircraft performance parameters 337 of FIG. 3.

The historical flight data 407 includes a plurality of entries 430. Each of the entries 430 corresponds to a particular instance of flight data, such as the flight data 105 of FIG. 1. In a particular aspect, the entries 430 include one or more entries associated with flight data of the same aircraft (e.g., the aircraft 108) for which the aircraft performance model 181 is being trained. For example, the entries 430 include an entry 442 that corresponds to the flight data 105 received, during a particular flight, by the on-board computing device 102 at a first time from the data bus 140, generated by the sensors 142 during a first time interval, or both. The entry 442 includes a data collection time 496 indicating the first time, the first time interval, or both. In a particular aspect, the entries 430 include a second entry that corresponds to the flight data 105 received by the on-board computing device 102 at a second time from the data bus 140, generated by the sensors 142 during a second time interval, or both. The second entry includes a second data collection time indicating the second time, the second time interval, or both.

In a particular aspect, the entries 430 include one or more entries associated with flight data of a second aircraft that is distinct from the aircraft 108 for which the aircraft performance model 181 is being trained. For example, the entries 430 include an entry 442 that corresponds to first flight data received, during a particular flight, by a first on-board computing device of the second aircraft at a first time from a first data bus, generated by first sensors of the second aircraft during a first time interval, or both. The entry 442 includes a data collection time 496 indicating the first time, the first time interval, or both. In a particular aspect, the entries 442 include a second entry that corresponds to the first flight data received by the first on-board computing device at a second time from the first data bus, generated by the first sensors during a second time interval, or both. The second entry includes a second data collection time indicating the second time, the second time interval, or both.

The entry 442 indicates speed information (e.g., a Mach number 402, a ground speed 410, or both), location information (e.g., an altitude 412, a heading 414, or a combination thereof), ambient environment conditions (e.g., a total air temperature 404, wind speed 406, wind direction 408, or a combination thereof), or a combination thereof. In a particular aspect, the historical flight data 407 corresponds to a comma separated values (CSV) file and each line of the CSV file corresponds to an entry of the historical flight data 407. In a particular aspect, the historical flight data 223 of FIGS. 2-3 corresponds to a CSV file and each entry of the historical flight data 407 corresponds to (e.g., is based on) a line of the CSV file.

In a particular aspect, the Mach number 402, the total air temperature 404, the wind speed 406, the wind direction 408, the ground speed 410, the altitude 412, the heading 414, or a combination thereof, are detected by the sensors 142 during a particular flight of a particular aircraft (e.g., the aircraft 108 or a second aircraft). For example, the Mach number 402 corresponds to a detected Mach number of the particular aircraft at a first time during the particular flight. The total air temperature 404 corresponds to a detected air temperature outside the particular aircraft at a second time during the particular flight. The wind speed 406 corresponds to a detected wind speed outside the particular aircraft at a third time during the particular flight. The wind direction 408 corresponds to a detected wind direction outside the particular aircraft at a fourth time during the particular flight. The ground speed 410 corresponds to a detected ground speed of the particular aircraft at a fifth time during the particular flight. The altitude 412 corresponds to a detected altitude of the particular aircraft at a sixth time during the particular flight. The heading 414 corresponds to a detected heading of the particular aircraft at a seventh time during the particular flight. In a particular aspect, the data collection time 496 indicates the first time, the second time, the third time, the fourth time, the fifth time, the sixth time, the seventh time, an eighth time, a first time interval, or a combination thereof. In a particular aspect, the eighth time is greater than or equal to each of the first time, the second time, the third time, the fourth time, the fifth time, the sixth time, and the seventh time. In a particular aspect, the first time interval has a start time and an end time. The start time is less than or equal to each of the first time, the second time, the third time, the fourth time, the fifth time, the sixth time, and the seventh time. The end time is greater than or equal to each of the first time, the second time, the third time, the fourth time, the fifth time, the sixth time, and the seventh time.

In a particular aspect, each of particular sensors (e.g., the sensors 142 of FIG. 1 or the second sensors of the second aircraft) generates a time-series of values. For example, a first sensor of the sensors 142 generates a first time-series of values (e.g., Mach numbers) and a second sensor of the sensors 142 generates a second time-series of values (e.g., total air temperature measurements). In a particular aspect, the first sensor generates the first time-series of values (e.g., at two second intervals) asynchronously with the second time-series of values (e.g., at ten second intervals). For example, the first sensor generates a first Mach number at time t1 (e.g., 10:00:01), a second Mach number at time t2 (e.g., 10:00:03), a third Mach number at time t3 (e.g., 10:00:05), a fourth Mach number at time t4 (e.g., 10:00:07), a fifth Mach number at time t5 (e.g., 10:00:09), and so on. The second sensor generates a first total air temperature at time t11 (e.g., 10:00:02) and a second total air temperature at time t12 (e.g., 10:00:12).

In a particular aspect, aggregation or binning is used to determine flight data values corresponding to a common time-series (e.g., at five second intervals). For example, values for the entry 442 correspond to a first time interval (e.g., 10:00:03-10:00:08). To illustrate, a first value (e.g., the Mach number 402) is based on the second Mach number for time t2 (e.g., 10:00:03), the third Mach number for time t3 (e.g., 10:00:05), the fourth Mach number for time t4 (e.g., 10:00:07), or a combination thereof. In a particular aspect, the first value (e.g., the Mach number 402) is based on an average of the second Mach number for time t2 (e.g., 10:00:03), the third Mach number for time t3 (e.g., 10:00:05), the fourth Mach number for time t4 (e.g., 10:00:07), or a combination thereof.

In a particular aspect, the entry 242 indicates a data collection time 496 corresponding to the first time interval. For example, the data collection time 496 includes a first timestamp corresponding to a beginning (e.g., 10:00:03) of the first time interval, a second timestamp corresponding to an end (e.g., 10:00:08) of the first time interval, a third timestamp corresponding to a middle (e.g., 10:00:05) of the first time interval, or a combination thereof.

The historical aircraft performance parameters 457 includes a plurality of entries 480. Each of the entries 480 corresponds to a particular entry of the entries 430. For example, the entries 430 include an entry 492 indicating aircraft performance parameters corresponding to the entry 442. For example, the entry 492 indicates drag 452, lift 454, mass 456, fuel consumption 458, or a combination thereof. In a particular aspect, the entry 492 indicates the data collection time 496, a reference to the entry 442, or both.

The aircraft performance model 181 includes a recurrent neural network layer 183 (e.g., a LSTM network layer, a gated recurrent unit (GRU) layer, or both). In a particular aspect, the aircraft performance model 181 includes one or more additional network layers, such as a CNN layer, multilayer perceptron (MLP) network layer, or both, coupled to the recurrent neural network layer 183. In a particular implementation, the aircraft performance model 181 includes a one-dimension CNN layer (e.g., including 32 filters with a kernel size of 3), a one-dimension max pooling layer (e.g., having a pool size of 2 and no strides), a LSTM network layer (e.g., including 64 LSTM cells), a first densely-connected neural network layer (e.g., including 32 cells using a rectified linear unit (ReLU) activation function), a second densely-connected neural network layer (e.g., including 1 cell using a linear activation function), or a combination thereof. In a particular aspect, the CNN layer enables identification of relevant features of the historical flight data 407 for determining aircraft performance parameters, while the LSTM layer is suitable for detecting and identifying temporal patterns and trends in time-series components.

During operation, the model trainer 472 trains (generates or updates) the aircraft performance model 181 based on the historical flight data 407 and the historical aircraft performance parameters 457. For example, the model trainer 472 provides the entry 442 as input to the aircraft performance model 181 that uses the neural network layers to process the entry 442 and produce a corresponding output. The model trainer 472 compares the output to the entry 492 and updates hyperparameters (e.g., weights and biases) of the aircraft performance model 181 based on the comparison. The model trainer 472 provides a second entry as input to the aircraft performance model 181 and updates the hyperparameters of the aircraft performance model 181 based on a comparison of a second entry of the entries 480 and a second output of the aircraft performance model 181.

In a particular example, the model trainer 472 trains multiple versions of the aircraft performance model 181 having various types of layers, counts of cells in layers, activation functions, loss functions, optimization methods, learning rates, dropout mechanisms, number of epochs, pooling size, kernel size, other parameters, etc. The model trainer 472 selects one of the multiple versions as the aircraft performance model 181. For example, the model trainer 472 uses, during a training phase, a first subset of the historical flight data 407 and a first subset of the historical aircraft performance parameters 457 to generate multiple aircraft performance models. The model trainer 472 uses a second subset of the historical flight data 407 and a corresponding second subset of the historical aircraft performance parameters 457 during a training phase. For example, the model trainer 472 provides the second subset of the historical flight data 407 to the multiple aircraft performance models as input, compares the output of the multiple aircraft performance models to the second subset of the historical aircraft performance parameters 457, and determines prediction errors of the multiple aircraft performance models based on the comparison. The model trainer 472 selects a particular aircraft performance model that corresponds to a lowest prediction error as the aircraft performance model 181. The model trainer 472 thus enables the aircraft performance model 181 to be adapted (e.g., generated or updated) to intrinsic properties of the historical flight data 407.

Figure 5:
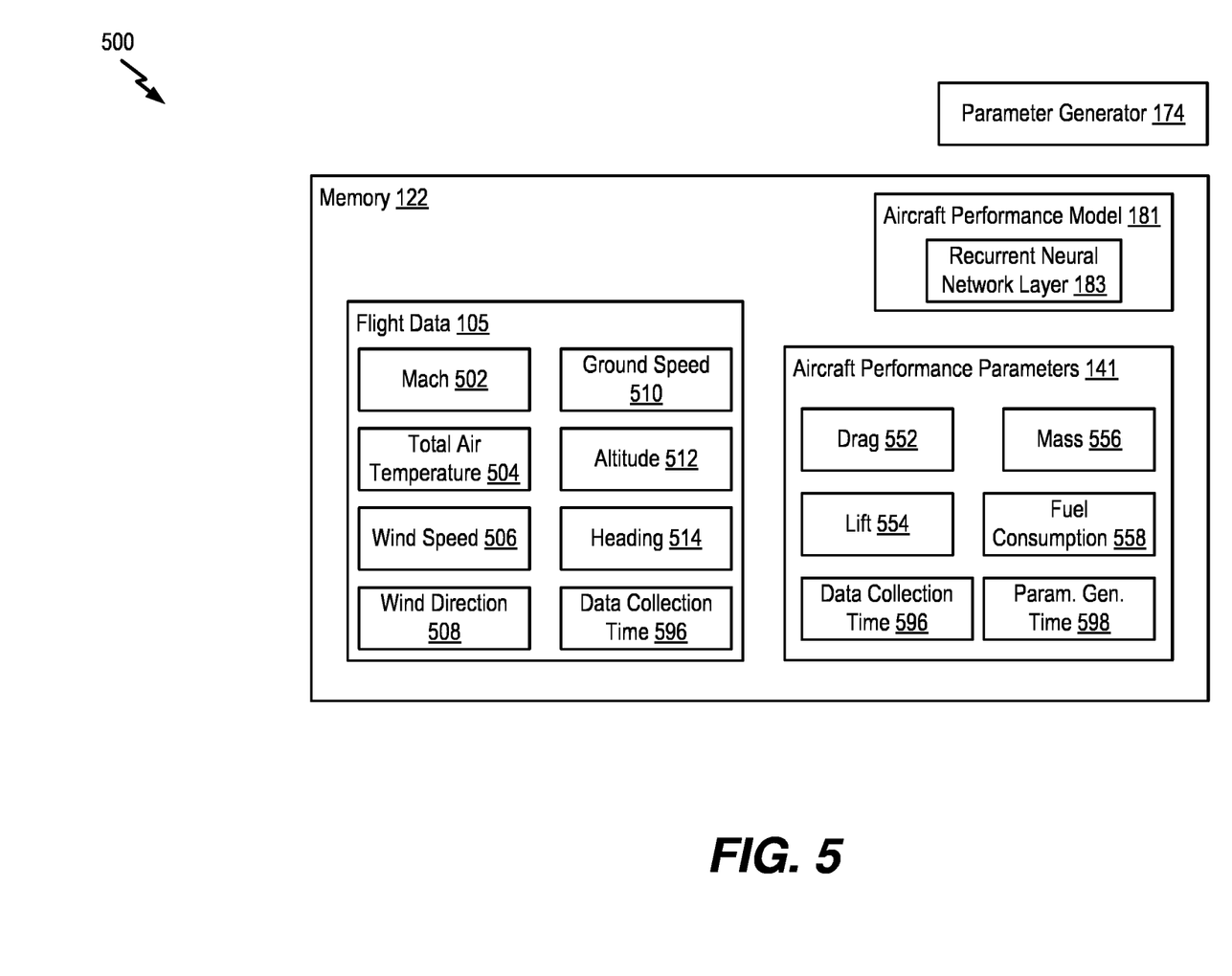
FIG. 5 is a diagram that illustrates aspects of a parameter generator and a memory of the system of FIG. 1.

Referring to FIG. 5, a diagram 500 illustrates aspects of the parameter generator 174 and the memory 122. The parameter generator 174 has access to the aircraft performance model 181.

During operation, the parameter generator 174 has access (e.g., in real-time) to the flight data 105 generated by the sensors 142 during a flight. The flight data 105 indicates a plurality of parameters. For example, the flight data 105 indicates speed information (e.g., a Mach number 502, a ground speed 510, or both), location information (e.g., an altitude 512, a heading 514, or a combination thereof), ambient environment conditions (e.g., a total air temperature 504, wind speed 506, wind direction 508, or a combination thereof), or a combination thereof. The parameter generator 174 generates, based on the flight data 105 and the aircraft performance model 181, the aircraft performance parameters 141. For example, the parameter generator 174 provides the flight data 105 as input to the aircraft performance model 181. The aircraft performance model 181 processes the flight data 105 and outputs the aircraft performance parameters 141. For example, the aircraft performance parameters 141 (e.g., drag 552, lift 554, mass 556, fuel consumption 558, or a combination thereof) indicate predicted performance parameter values corresponding to the flight data 105. In a particular aspect, the parameter generator 174 determines the aircraft performance parameters 141 in real-time (e.g., within seconds) of receiving the flight data 105.

Figure 6:
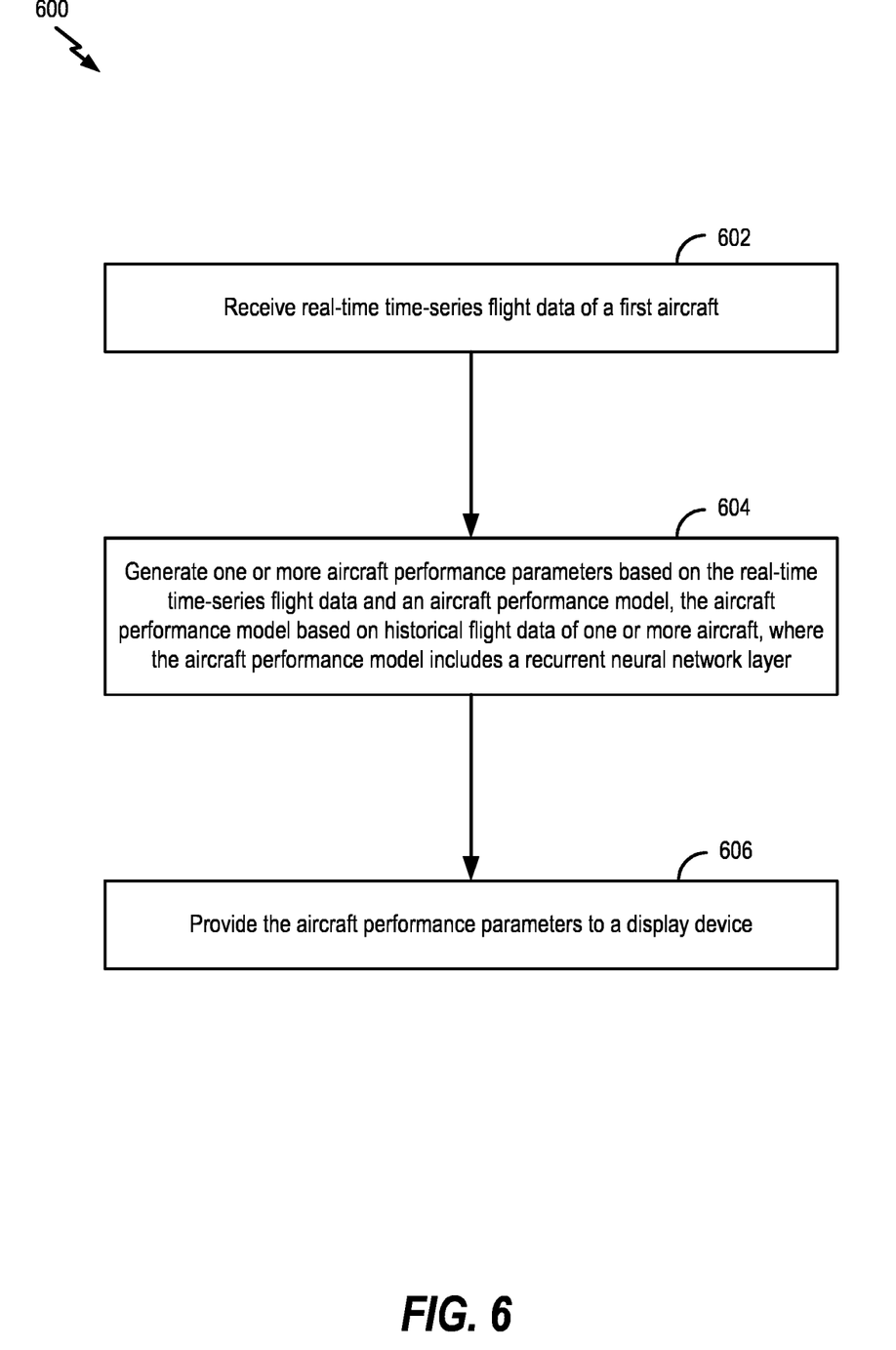
FIG. 6 is a flow chart of an example of a method of flight performance parameter computation.

FIG. 6 is a flowchart of a method 600 for flight performance parameter computation. In a particular aspect, the method 600 is performed by the parameter generator 174, the GUI generator 176, the processor 170, the on-board computing device 102, the aircraft 108, the off-board device 162, the system 100 of FIG. 1, or any combination thereof.

The method 600 includes receiving real-time time-series flight data of a first aircraft, at 602. For example, the parameter generator 174 of FIG. 1 receives the flight data 105 (e.g., real-time time-series flight data) from the data bus 140 of the aircraft 108, as described with reference to FIG. 1.

The method 600 also includes generating one or more aircraft performance parameters based on the real-time time-series flight data and an aircraft performance model, at 704. For example, the parameter generator 174 of FIG. 1 generates the aircraft performance parameters 141 based on the flight data 105 (e.g., real-time time-series flight data) and the aircraft performance model 181, as described with reference to FIGS. 1 and 5. The aircraft performance model 181 includes the recurrent neural network layer 183.

The method 600 further includes providing the aircraft performance parameters to a display device, at 606. For example, the GUI generator 176 of FIG. 1 provides a GUI 163 to the display device 144. The GUI 163 indicates one or more of the aircraft performance parameters 141, such as predicted aircraft performance parameter values indicated by the drag 552, the lift 554, the mass 556, the fuel consumption 558 of FIG. 5, or a combination thereof.

The method 600 thus enables use of the aircraft performance parameters 141 by a pilot to make informed decisions during a flight of the aircraft 108. The predicted values of the aircraft performance parameters 141 are displayed in real-time within seconds of detection of the corresponding flight data 105. Using the aircraft performance model 181 (e.g., a machine-learning model) enables the aircraft performance parameters 141 to be estimated in real-time rather than using more time-intensive calculations after landing. In a particular aspect, the aircraft performance parameters 141 are used to generate recommended settings, automatically update a setting or configuration of the aircraft 108, or a combination thereof. One or more of the aircraft performance parameters 141, the recommended settings, or a combination thereof, can be displayed to improve pilot situational awareness and to enable the pilot to make informed flight decisions based on real-time data. For example, the pilot can update a flight setting, such as accept or edit a recommended setting, based on the displayed information.

Figure 7:
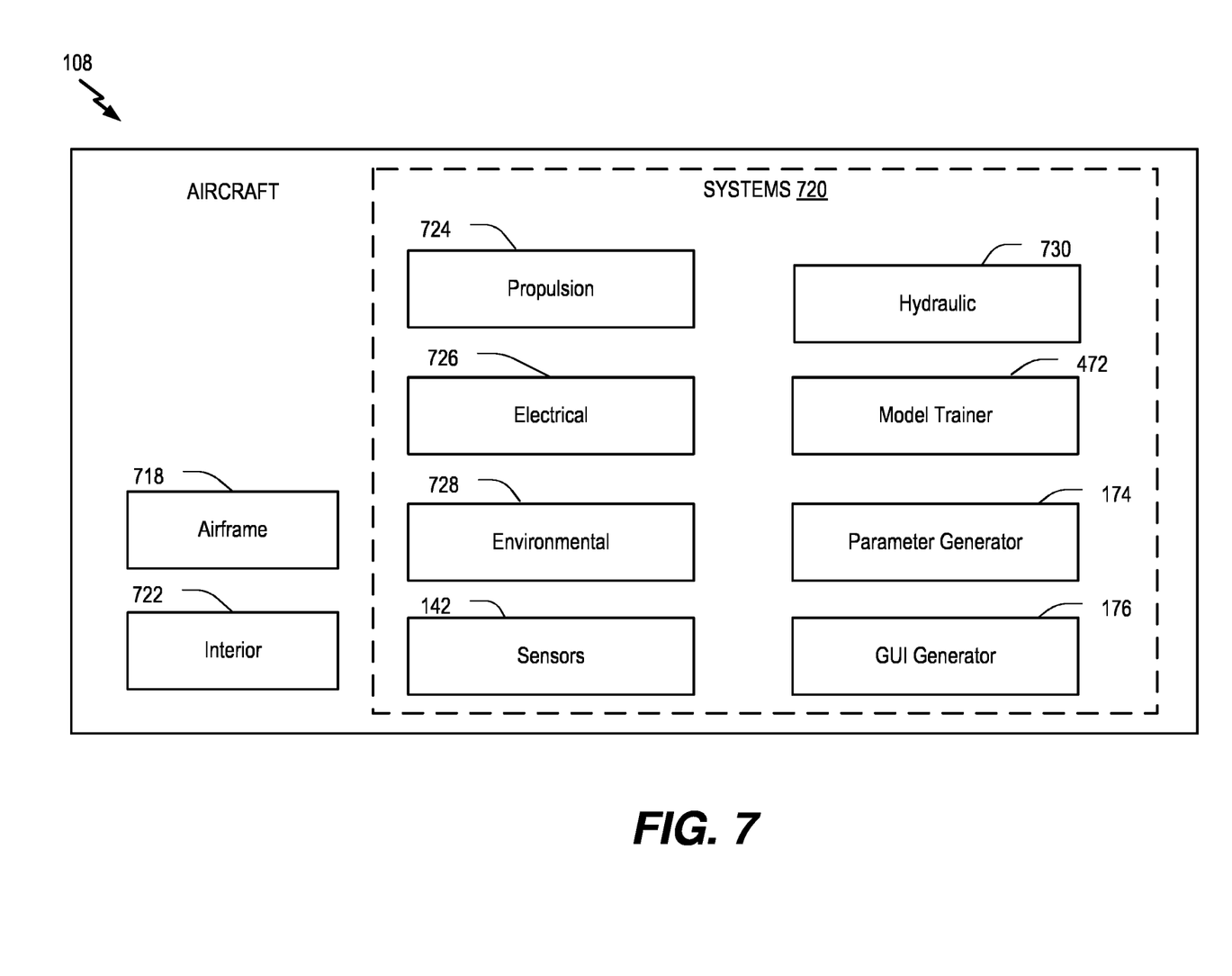
FIG. 7 is a block diagram of an aircraft configured to support aspects of computer-implemented methods and computer-executable program instructions (or code) according to the present disclosure.

Aspects of the disclosure may be described in the context of the aircraft 108 as shown in FIG. 7. The aircraft 108 includes an airframe 718 with a plurality of systems 720 (e.g., high-level systems) and an interior 722. Examples of the systems 720 include one or more of a propulsion system 724, an electrical system 726, an environmental system 728, a hydraulic system 730, the sensors 142, the parameter generator 174, and the GUI generator 176. In a particular implementation, the systems 720 include the model trainer 472. Other systems can also be included.

The parameter generator 174, the GUI generator 176, the model trainer 472, or a combination thereof, are configured to support aspects of computer-implemented methods and computer-executable program instructions (or code) according to the present disclosure. For example, the parameter generator 174, the GUI generator 176, the model trainer 472, or portions thereof, are configured to execute instructions to initiate, perform, or control one or more operations described with reference to FIGS. 1-6.

Although one or more of FIGS. 1-7 illustrate systems, apparatuses, and/or methods according to the teachings of the disclosure, the disclosure is not limited to these illustrated systems, apparatuses, and/or methods. One or more functions or components of any of FIGS. 1-7 as illustrated or described herein may be combined with one or more other portions of another of FIGS. 1-7. For example, one or more elements of the method 700 of FIG. 7 may be performed in combination with other operations described herein. Accordingly, no single implementation described herein should be construed as limiting and implementations of the disclosure may be suitably combined without departing form the teachings of the disclosure. As an example, one or more operations described with reference to FIGS. 1-6 may be optional, may be performed at least partially concurrently, and/or may be performed in a different order than shown or described.

A further understanding of at least some of the aspects of the present disclosure is provided with reference to the following numbered Clauses, in which:

Clause 1: A device for flight performance parameter computation, the device comprising: a memory configured to store an aircraft performance model, the aircraft performance model based on historical flight data of one or more aircraft, wherein the aircraft performance model includes a recurrent neural network layer; a network interface configured to receive real-time time-series flight data from a data bus of a first aircraft; and a processor configured to: receive, via the network interface, the real-time time-series flight data; generate, based on the real-time time-series flight data and the aircraft performance model, one or more aircraft performance parameters; and provide the aircraft performance parameters to a display device.

Clause 2: A device as is described in any of Clauses 1 and 3-11, wherein the aircraft performance parameters include at least one of drag, lift, mass, or a combination thereof.

Clause 3: A device as is described in any of Clauses 1, 2 and 4-11, wherein the recurrent neural network layer includes a long short-term memory (LSTM) network layer.

Clause 4: A device as is described in any of Clauses 1-3 and 5-11, wherein the aircraft performance model also includes a convolutional neural network (CNN) layer, a multilayer perceptron (MLP) network layer, or both.

Clause 5: A device as is described in any of Clauses 1-4 and 6-11, wherein the recurrent neural network layer includes a gated recurrent unit (GRU) layer.

Clause 6: A device as described in any of Clauses 1-5 and 7-11, wherein the real-time time-series flight data includes Mach number, total air temperature, wind speed, wind direction, ground speed, altitude, heading, or a combination thereof.

Clause 7: A device as described in any of Clauses 1-6 and 8-11, wherein the aircraft performance parameters also include fuel consumption.

Clause 8: A device as described in any of Clauses 1-7 and 9-11, wherein the one or more aircraft include the first aircraft.

Clause 9: A device as described in any of Clauses 1-8, 10 and 11, wherein one or more aircraft have the same aircraft type as the first aircraft.

Clause 10: A device as described in any of Clauses 1-9 and 11, wherein the processor is configured to receive the aircraft performance model from a second device.

Clause 11: A device as described in any of Clauses 1-10, wherein the processor is further configured to generate the aircraft performance model based on the historical flight data and historical aircraft performance parameters associated with the historical flight data.

Clause 12: A method of flight performance parameter computation, the method comprising, receiving, at a device, real-time time-series flight data of a first aircraft; generating one or more aircraft performance parameters based on the real-time time-series flight data and an aircraft performance model, the aircraft performance model based on historical flight data of one or more aircraft, wherein the aircraft performance model includes a recurrent neural network layer; and providing the aircraft performance parameters to a display device.

Clause 13: A method as is described in any of Clauses 12 and 14-17, further comprising, receiving historical data from a database, the historical data including historical flight data of one or more aircraft and historical aircraft performance parameters associated with the historical flight data; generating filtered historical data by applying a filtering technique to the historical data to remove outliers; generating smoothed historical data by applying a smoothing technique to the filtered historical data; selecting one or more features by applying a feature selection technique to the smoothed historical data; extracting feature values of the one or more features from the smoothed historical data; and generating the aircraft performance model based on the feature values and the historical aircraft performance parameters.

Clause 14: A method as is described in any of Clauses 12, 13, and 15-17, wherein the one or more features include Mach number, total air temperature, wind speed, wind direction, ground speed, altitude, heading, or a combination thereof.

Clause 15: A method as is described in any of Clauses 12-14, 16 and 17, wherein the historical aircraft performance parameters include at least one of drag, lift, mass, or a combination thereof.

Clause 16: A method as is described in any of Clauses 12-15 and 17, further comprising receiving the aircraft performance model from a second device.

Clause 17: A method as is described in any of Clauses 12-16, wherein the recurrent neural network layer includes a long short-term memory (LSTM) network layer, and wherein the aircraft performance model also includes a convolutional neural network (CNN) layer.

Clause 18: A computer-readable storage device storing instructions that, when executed by one or more processors, cause the one or more processors to: receive real-time time-series flight data of a first aircraft; generate one or more aircraft performance parameters based on the real-time time-series flight data and an aircraft performance model, the aircraft performance model based on historical flight data of one or more aircraft, wherein the aircraft performance model includes a recurrent neural network layer; and provide the aircraft performance parameters to a display device.

Clause 19: A computer-readable storage device as is described in any of Clauses 18 and 20, wherein the aircraft performance parameters include at least one of drag, lift, mass, or a combination thereof.

Clause 20: A computer-readable storage device as is described in any of Clauses 18 and 19, wherein the recurrent neural network layer includes a long short-term memory (LSTM) network layer, and wherein the aircraft performance model also includes a convolutional neural network (CNN) layer.

Examples described above are illustrative and do not limit the disclosure. It is to be understood that numerous modifications and variations are possible in accordance with the principles of the present disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device for flight performance parameter computation, the device comprising:
    a memory configured to store an aircraft performance model, the aircraft performance model based on historical flight data of one or more aircraft, wherein the aircraft performance model includes a recurrent neural network layer;
    a network interface configured to receive real-time time-series flight data from a data bus of a first aircraft; and
    a processor configured to:
        receive, via the network interface, the real-time time-series flight data;
        generate, based on the real-time time-series flight data and the aircraft performance model, predicted aircraft performance parameters;
        generate a recommended aircraft setting based on the predicted aircraft performance parameters;
        provide the predicted aircraft performance parameters and the recommended aircraft setting to a display device;
        automatically update a flight control setting based on the recommended aircraft setting; and
        update the aircraft performance model based on the real-time time-series flight data and observed aircraft performance parameters, wherein said update the aircraft performance model causes the processor to:
            generate a plurality of candidate aircraft performance models based on the aircraft performance model, a first subset of the real-time time-series flight data, and a second subset of the observed aircraft performance parameters, wherein each of the plurality of candidate aircraft performance models is generated by updating at least one hyperparameter of the aircraft performance model, wherein the at least one hyperparameter is updated based on a comparison of an output of the aircraft performance model and a parameter of the second subset of the observed aircraft performance parameters, and wherein the output is generated based on data from the first subset of the real-time time-series flight data;
            provide a third subset of the real-time time-series flight data, and a fourth subset of the observed aircraft performance parameters to the plurality of candidate aircraft performance models to generate a plurality of prediction error metrics; and
            select a particular candidate aircraft performance model from the plurality of candidate aircraft performance models based on the plurality of prediction error metrics.

2. The device of claim 1, wherein the aircraft performance model is updated based on drag, lift, mass, or a combination thereof.

3. The device of claim 1, wherein the recurrent neural network layer includes a long short-term memory (LSTM) network layer, a gated recurrent unit (GRU) layer, or both, and wherein the aircraft performance model also includes a convolutional neural network (CNN) layer, a multilayer perceptron (MLP) network layer, or both.

4. The device of claim 1, wherein the real-time time-series flight data includes Mach number, total air temperature, wind speed, wind direction, ground speed, altitude, heading, or a combination thereof.

5. The device of claim 1, wherein the predicted aircraft performance parameters also include fuel consumption.

6. The device of claim 1, wherein the processor is configured to receive the aircraft performance model from a second device.

7. The device of claim 1, wherein the processor is further configured to generate the aircraft performance model based on the historical flight data and historical aircraft performance parameters associated with the historical flight data.

8. The device of claim 1, wherein the flight control setting is a trim setting.

9. The device of claim 1, wherein the predicted aircraft performance parameters are generated while the first aircraft is in flight.

10. A method of flight performance parameter computation, the method comprising:
receiving, at a device, real-time time-series flight data of a first aircraft;
generating predicted aircraft performance parameters based on the real-time time-series flight data and an aircraft performance model, the aircraft performance model based on historical flight data of one or more aircraft, wherein the aircraft performance model includes a recurrent neural network layer;
generating a recommended aircraft setting based on the predicted aircraft performance parameters
providing the predicted aircraft performance parameters to a display device;
automatically updating a flight control setting based on the recommended aircraft setting; and
updating the aircraft performance model based on the real-time time-series flight data and observed aircraft performance parameters, wherein updating the aircraft performance model comprises:
generating a plurality of candidate aircraft performance models based on the aircraft performance model, a first subset of the real-time time-series flight data, and a second subset of the observed aircraft performance parameters, wherein each of the plurality of candidate aircraft performance models is generated by updating at least one hyperparameter of the aircraft performance model, wherein the at least one hyperparameter is updated based on a comparison of an output of the aircraft performance model and a parameter of the second subset of the observed aircraft performance parameters, and wherein the output is generated based on data from the first subset of the real-time time-series flight data;
providing a third subset of the real-time time-series flight data, and a fourth subset of the observed aircraft performance parameters to the plurality of candidate aircraft performance models to generate a plurality of prediction error metrics; and
selecting a particular candidate aircraft performance model from the plurality of candidate aircraft performance models based on the plurality of prediction error metrics.

11. The method of claim 10, further comprising:
receiving historical data from a database, the historical data including the historical flight data and historical aircraft performance parameters associated with the historical flight data;
generating filtered historical data by applying a filtering technique to the historical data to remove outliers;
generating smoothed historical data by applying a smoothing technique to the filtered historical data;
selecting one or more features by applying a feature selection technique to the smoothed historical data;
extracting feature values of the one or more features from the smoothed historical data; and
generating the aircraft performance model based on the feature values and the historical aircraft performance parameters.

12. The method of claim 11, wherein the one or more features include Mach number, total air temperature, wind speed, wind direction, ground speed, altitude, heading, or a combination thereof.

13. The method of claim 11, wherein the historical aircraft performance parameters include at least one of drag, lift, mass, or a combination thereof.

14. The method of claim 11, wherein the flight control setting is a trim setting.

15. The method of claim 11, wherein the predicted aircraft performance parameters are generated while the first aircraft is in flight.

16. The method of claim 10, wherein the recurrent neural network layer includes a long short-term memory (LSTM) network layer, and wherein the aircraft performance model also includes a convolutional neural network (CNN) layer.

17. A non-transitory computer-readable storage device comprising instructions that, when executed by one or more processors, cause the one or more processors to:
receive real-time time-series flight data of a first aircraft;
generate predicted aircraft performance parameters based on the real-time time-series flight data and an aircraft performance model, the aircraft performance model based on historical flight data of one or more aircraft, wherein the aircraft performance model includes a recurrent neural network layer;
generate a recommended aircraft setting based on the predicted aircraft performance parameters;
provide the predicted aircraft performance parameters to a display device;
automatically update a flight control setting based on the recommended aircraft setting; and
update the aircraft performance model based on the real-time time-series flight data and observed aircraft performance parameters, wherein said update the aircraft performance model causes the one or more processors to:
generate a plurality of candidate aircraft performance models based on the aircraft performance model, a first subset of the real-time time-series flight data, and a second subset of the observed aircraft performance parameters, wherein each of the plurality of candidate aircraft performance models is generated by updating at least one hyperparameter of the aircraft performance model, wherein the at least one hyperparameter is updated based on a comparison of an output of the aircraft performance model and a parameter of the second subset of the observed aircraft performance parameters, and wherein the output is generated based on data from the first subset of the real-time time-series flight data;
provide a third subset of the real-time time-series flight data, and a fourth subset of the observed aircraft performance parameters to the plurality of candidate aircraft performance models to generate a plurality of prediction error metrics; and
select a particular candidate aircraft performance model from the plurality of candidate aircraft performance models based on the plurality of prediction error metrics.

18. The non-transitory computer-readable storage device of claim 17, wherein the predicted aircraft performance parameters include at least one of drag, lift, mass, or a combination thereof.

19. The non-transitory computer-readable storage device of claim 17, wherein the recurrent neural network layer includes a long short-term memory (LSTM) network layer, and wherein the aircraft performance model also includes a convolutional neural network (CNN) layer.

20. The non-transitory computer-readable storage device of claim 17, wherein the flight control setting is a trim setting.

\* \* \* \* \*